US012201951B2

(12) United States Patent
Whitman et al.

(10) Patent No.: US 12,201,951 B2
(45) Date of Patent: Jan. 21, 2025

(54) MIXING SYSTEMS AND METHODS

(71) Applicant: EXPONENT BEAUTY, INC., San Francisco, CA (US)

(72) Inventors: Elizabeth Robinson Whitman, San Francisco, CA (US); Ralph James DeVito, Oxford, CT (US); Pepin Sebastian Gelardi, Brooklyn, NY (US); Emma Pearl Willmer, Brooklyn, NY (US)

(73) Assignee: EXPONENT BEAUTY, INC., San Francisco, CA (US)

( * ) Notice: Subject to any disclaimer, the term of this patent is extended or adjusted under 35 U.S.C. 154(b) by 771 days.

(21) Appl. No.: 17/376,910

(22) Filed: Jul. 15, 2021

(65) Prior Publication Data

US 2022/0016583 A1 Jan. 20, 2022

Related U.S. Application Data

(60) Provisional application No. 63/052,089, filed on Jul. 15, 2020.

(51) Int. Cl.

| | |
|---|---|
| ***B01F 23/00*** | (2022.01) |
| ***B01F 23/50*** | (2022.01) |
| ***B01F 23/53*** | (2022.01) |
| ***B01F 35/60*** | (2022.01) |
| ***B01F 35/71*** | (2022.01) |
| *B01F 101/21* | (2022.01) |

(52) U.S. Cl.

CPC .............. *B01F 23/59* (2022.01); *B01F 23/53* (2022.01); *B01F 35/6052* (2022.01); *B01F 35/71411* (2022.01); *B01F 35/7161* (2022.01); *B01F 35/717613* (2022.01); *B01F 2101/21* (2022.01)

(58) Field of Classification Search

CPC .............. B01F 23/59; B01F 35/717613; B01F 35/71411; B01F 35/6052; B01F 23/53; B01F 2101/21

See application file for complete search history.

(56) References Cited

U.S. PATENT DOCUMENTS

| | | | | |
|---|---|---|---|---|
| 6,655,525 B2 | 12/2003 | Song | | |
| 6,655,551 B2 * | 12/2003 | Manne | B01F 35/7546 222/137 | |
| 7,377,296 B2 | 5/2008 | Gueret | | |

(Continued)

OTHER PUBLICATIONS

International Search Report and Written Opinion dated Oct. 26, 2021 which was issued in connection with PCT/US21/41826.

(Continued)

*Primary Examiner* — Anshu Bhatia

(74) *Attorney, Agent, or Firm* — Buckley, Maschoff & Talwalkar LLC

(57) ABSTRACT

A mixing assembly, device, system and method for operating are provided which includes a powder assembly holding a first container containing a powder, the powder assembly having a powder dispensing means for dispensing a predetermined quantity of the powder, a liquid assembly holding a second container containing a liquid, the liquid assembly having a liquid dispensing means for dispensing a predetermined amount of the liquid, and a mixing bowl for receiving the predetermined quantity of the powder and the predetermined amount of the liquid.

18 Claims, 8 Drawing Sheets

(56) References Cited

U.S. PATENT DOCUMENTS

| | | | |
|---|---|---|---|
| 7,597,216 | B2 | 10/2009 | Behar et al. |
| 2002/0179639 | A1 | 12/2002 | Bartholomew |
| 2010/0000568 | A1 | 1/2010 | Fraillon |
| 2014/0020706 | A1 | 1/2014 | Thiebaut |
| 2016/0096673 | A1 | 4/2016 | Leibovitch |
| 2016/0263539 | A1 | 9/2016 | Madic et al. |
| 2017/0065995 | A1 | 3/2017 | Burrowes et al. |

OTHER PUBLICATIONS

European Search Report and Written Opinion dated Jun. 21, 2024 which was issued in connection with EP21842979.3.

* cited by examiner

MIXING SYSTEMS AND METHODS

PRIORITY

This application is based on, and claims benefit of and priority to, U.S. Provisional Patent Application Ser. No. 63/052,089 filed on Jul. 15, 2020, the contents of which are hereby incorporated by reference in their entirety for all purposes.

TECHNICAL FIELD

Some embodiments are directed to a mixing system and method that allows the combination of a powder with a liquid on demand.

BACKGROUND

Many formulations, such as those used in the skincare and beauty fields, require the use of active ingredients that become unstable or degrade over time when exposed to oxygen and ultraviolet light. Many skincare providers claim to have stabilized their ingredients. Unfortunately, research by the Applicants has shown that the average clinical skincare jar of moisturizer or serum can lose up to half of its concentration in a mere eight weeks of use. Many skincare providers attempt to maximize the shelf life and safety of a formula rather than the stability and efficacy of the key active and beneficial ingredients.

SUMMARY

According to some embodiments, a mixing system and method may include a powder assembly holding a first container containing a powder, the powder assembly having a powder dispensing means for dispensing a predetermined quantity of the powder, a liquid assembly holding a second container containing a liquid, the liquid assembly having a liquid dispensing means for dispensing a predetermined amount of the liquid, and a mixing bowl for receiving the predetermined quantity of the powder and the predetermined amount of the liquid.

Embodiments allow in the moment mixing of ingredients while their efficacy is high and undegraded by oxygen or ultraviolet light. Embodiments allow accurate dosing control of both the powder and the liquid ensuring the ingredients are mixed in optimal proportions.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
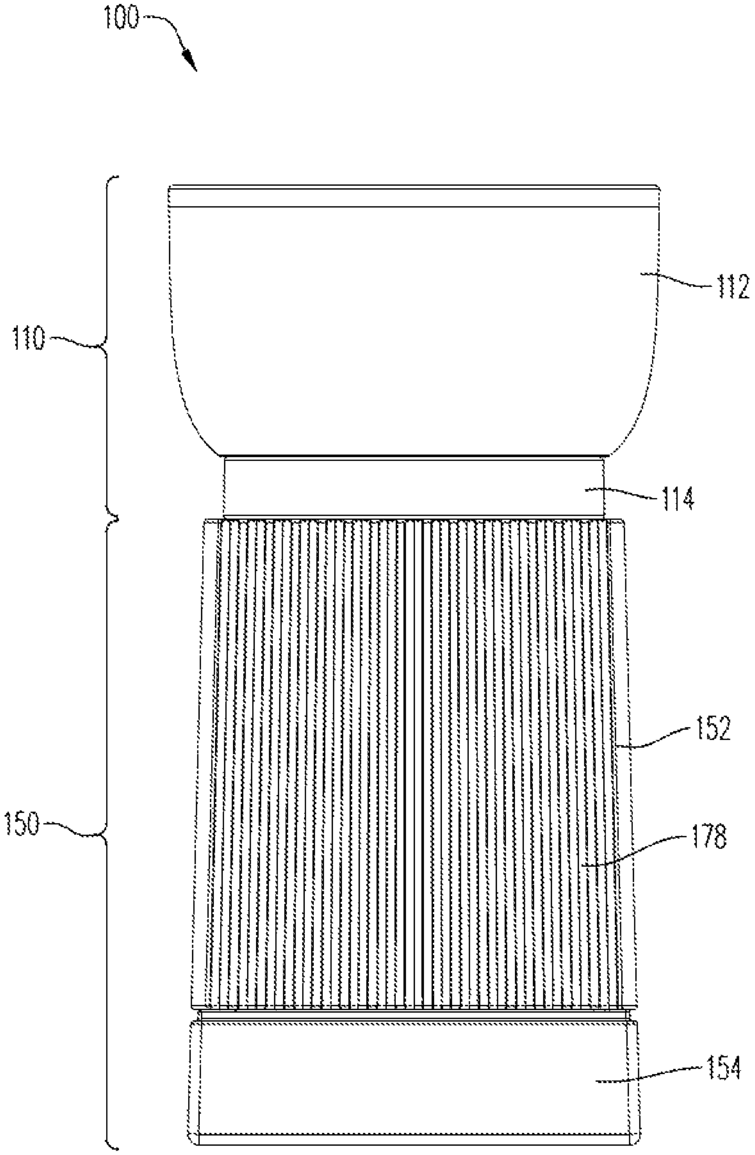
FIG. 1 is a side view of a mixing system pursuant to some embodiments.

The present invention relates to a new and useful mixing system and method and will be described by first referring to FIG. 1 which illustrates various components of a mixing system 100 pursuant to some embodiments. In the embodiment depicted in FIG. 1, the mixing system 100 has two main components, a powder assembly 110 and a liquid assembly 150. In some embodiments, the powder assembly 110 is removably coupled to the liquid assembly 150 at a powder assembly cap 114. In some embodiments, when the powder assembly 110 is detached from the liquid assembly 150 the powder assembly cap 114 may be removed from an outer bottle 112 to allow a user to access an interior of the powder assembly 110 to, e.g., refill a powder jar held therein.

As will be described further herein, the powder assembly cap 114 may also be formed to allow a predetermined quantity or volume of powder to drop from the powder assembly 110 into a mixing bowl. In one embodiment described herein the mixing bowl is formed or held within a top portion of the liquid assembly 150. In other embodiments, the mixing bowl may be formed as a separate component positioned between the powder assembly 110 and the liquid assembly 150. In some embodiments, the base 154 of the liquid assembly 150 may be removed from a liquid assembly cap 152 to allow a user to access an interior of the liquid assembly 150 to, e.g., refill a liquid bottle held therein. In the embodiment depicted in FIG. 1, the exterior surface of the liquid assembly cap 152 is formed with a series of vertical ridges or knurls 178, but such features are not required. Further, while the illustrative embodiment of a powder assembly 110 and liquid assembly 150 are shown as having a specific shape, those skilled in the art will appreciate that a number of different shapes and ornamental configurations may be used.

Each of the components may be made from plastic or other durable and non-toxic materials. The components together function to allow a user to mix a powder and a liquid on demand, allowing, for example, personal care products (such as cosmetics, skin cream or the like), pharmaceutical products, food products, decorative products or other compounds to be created when needed. The liquid assembly 150 and the powder assembly 110 dispense specified volumes of both the liquid and the powder. Controlling these volumes optimizes the effects of the resulting combination. The liquid assembly 150 and the powder assembly 110 function to protect the powder and the liquid from air, ultraviolet light, water and other particles that could contaminate the ingredients and/or cause degradation of the efficacy of the ingredients.

Figure 1A:
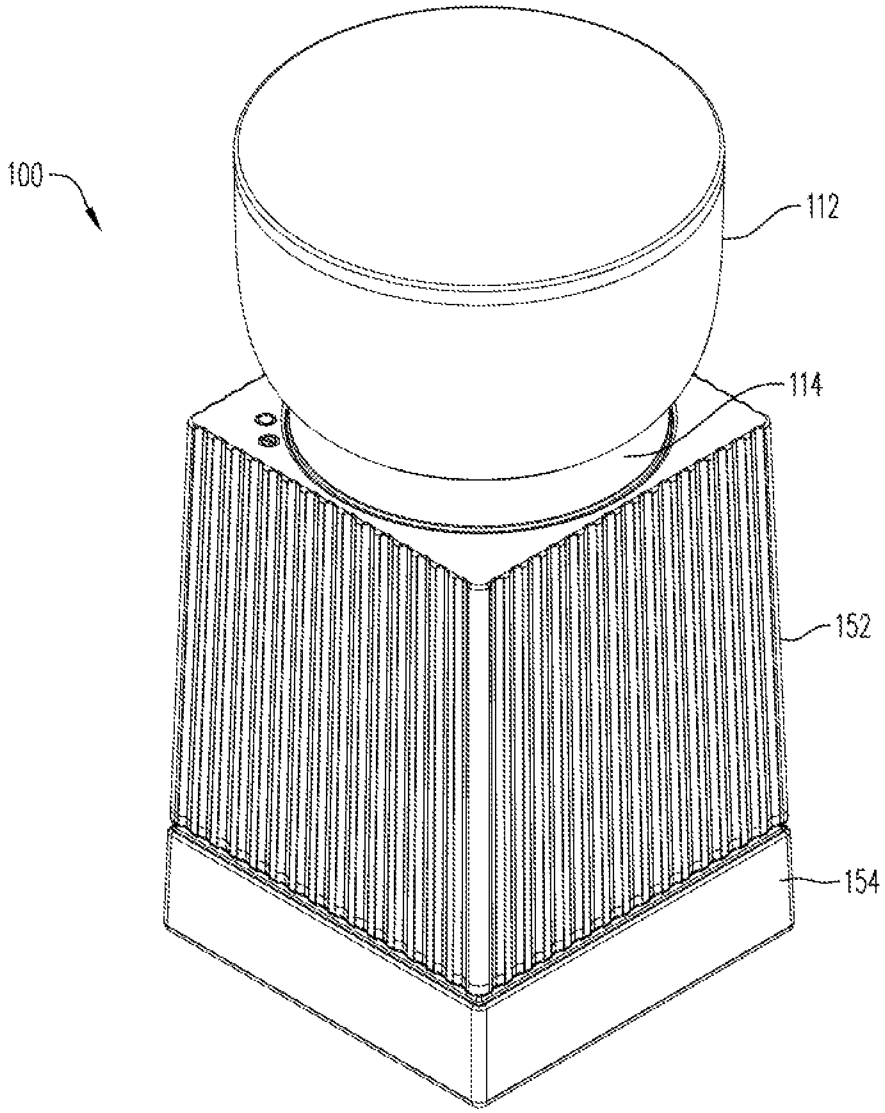
FIG. 1A is a perspective view of a mixing system pursuant to some embodiments.

The mixing system 100 may be formed or manufactured in a shape which facilitates ease of use by a user. For example, referring now to FIG. 1A which is a side perspective view of the mixing system 100, the liquid assembly 150 may be generally square or rectangular in shape making it easy for a user to hold while a user rotates and depresses a generally cylindrical powder assembly 110 to operate the system 100. Those skilled in the art, upon reading the present disclosure, will appreciate that other shapes and configurations may be used.

In use, the system 100 operates as follows. A powder (such as dried vitamin C, Retinol, CoQ10, Resveratrol, Willow Bark extract, or the like) is placed in an interior cavity of the powder assembly 110 (e.g., in a jar or bottle in the interior of the powder assembly 110). A liquid (such as an activator) is placed in an interior cavity of the liquid assembly 150 (e.g., in a jar or bottle in the interior of the liquid assembly 150). Pursuant to some embodiments, the powder and liquid may be compounds as discussed in co-pending and commonly-assigned U.S. patent application Ser. No. 17/375,588 for "Topical Composition Using a Two-Part Form Factor", the contents of which are hereby incorporated by reference in its entirety for all purposes.

The powder assembly 110 and liquid assembly 150 are engaged by a user action. For example, as will be described further below, the user may depress the powder assembly 110 with a light force (which causes a predetermined amount of liquid to be dispensed into a mixing well or bowl positioned at a top of the liquid assembly 150) while rotating the powder assembly 110 to cause a predetermined amount of powder to drop from the interior of the powder assembly 110 into the mixing well. The user may then separate the powder assembly 110 from the liquid assembly 150 revealing the mixing well (which now holds a predetermined amount of liquid as well as a predetermined amount of powder). The user may then mix the liquid with the powder using a finger or other object. The mixing activates the ingredients in the powder, thereby ensuring maximum efficacy immediately before the mixture is applied, e.g., to a user's skin.

The result is a mixing system and method that are reusable, that may be used with a quantity of liquid and powder before a refill is required, and that allows a desired volume of liquid to be mixed with a desired quantity of powder without requiring measurement by the user. Further, embodiments allow a user to selectively mix the liquid and powder as needed, thereby preserving the efficacy of the compounds. Embodiments allow the mixing apparatus to be washed and cleaned between uses. Other features and advantages will become apparent to those skilled in the art upon reading the following disclosure.

Figure 2:
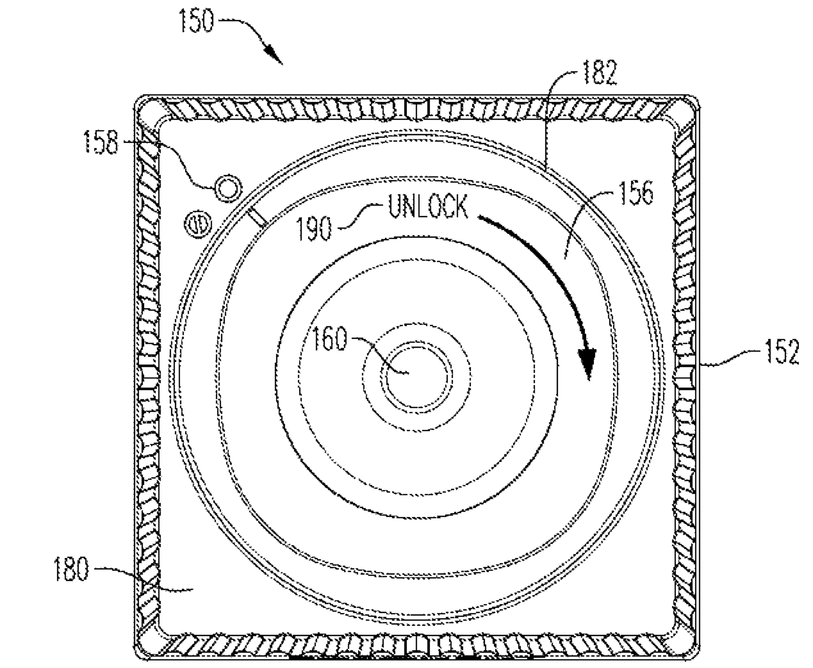
FIG. 2 is a top view of a liquid assembly pursuant to some embodiments.

Reference is now made to FIG. 2, where a top view of the liquid assembly 150 is shown as seen when the powder assembly 110 is removed. As shown, the top of the liquid assembly 150 holds a mixing well 156. The mixing well 156 is formed as a generally concave central area at the top of the liquid assembly 150. The mixing well 156 has a raised rim 182 at its perimeter. Pursuant to some embodiments, the raised rim 182 is shaped to match a corresponding protruding shape formed on a base of the powder assembly 110 (not shown in FIG. 2). The raised rim 182 helps to hold the powder assembly 110 in alignment with the mixing well 156 when the powder assembly 110 is properly installed on top of the liquid assembly 150. At the center (and at the bottom of the concave shape) of the mixing well 156 is a through hole that creates an opening in the mixing well 156 extending to a pump assembly 168 (not shown in FIG. 2) positioned beneath the mixing well 156. The through hole retains a small umbrella valve 160 such that the top valve surface is flush with the surface of the mixing well 156. The through hole may contain a short tube that extends between the small umbrella valve 160 and the pump assembly 168. The mixing well 156 is generally positioned in a center of the top of the liquid assembly 150 and the interior of the liquid assembly 150 is sealed from the outside by the mixing well 156, the umbrella valve 160, and a mixing well surround 180. Pursuant to some embodiments, the mixing well 156 may be rotated from a locked position to an unlocked position by rotating as depicted by rotation 190. In some embodiments, one or more lock indicators 158 may be formed on the mixing well surround 180 and the mixing well 156 to provide a visual indication to the user of the locked or unlocked status of the mixing well 156. Pursuant to some embodiments, when placed in a locked status or position, the mixing well 156 is unable to be depressed (e.g., the pump assembly 168 may not be engaged), thereby ensuring that liquid is not pumped into the mixing well 156 when the mixing well 156 is in a locked status. When unlocked, the pump assembly 168 may be engaged and liquid may be pumped into the mixing well 156 as described herein. Pursuant to some embodiments, the umbrella valve 160 serves to ensure that liquid that has been pumped into the mixing well 156 does not drain out of the mixing well 156 back into the pump assembly 168, thereby ensuring that a predetermined amount of liquid is available in the mixing well 156 for use.

Figure 3:
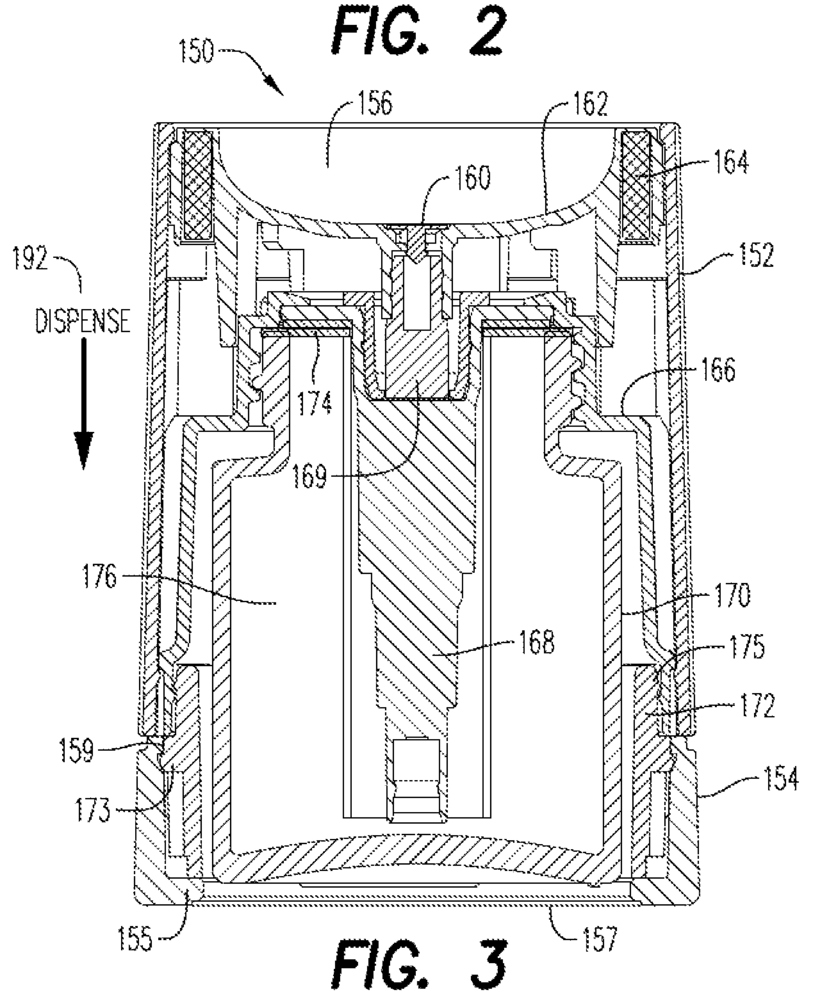
FIG. 3 is a side cross sectional view of a liquid assembly pursuant to some embodiments.

Reference is now made to FIG. 3 where a side cross-sectional view of a liquid assembly 150 pursuant to some embodiments is shown. The liquid assembly 150 may be configured to hold a bottle 170 which contains a liquid 176 for dispensing and mixing in the mixing bowl 156. The bottle 170 may be accessed (e.g., for insertion or removal) by separating the base 154 from the liquid assembly cap 152 (e.g., by unsnapping, unscrewing or otherwise pulling the two pieces apart). In some embodiments, the bottle 170 is screwed into threads of an inner cap 166 which is mounted on an interior of the liquid assembly cap 152. When the mixing well 156 is in an unlocked status, liquid 176 from within the bottle 170 may be pumped into the mixing well 156 by depressing the mixing well 156 (preferably by pressing down on the powder assembly 110 which is positioned to cover the mixing well 156 as described herein). This action causes the pump assembly 168 to be engaged and causes liquid 176 to flow from the interior of the bottle 170, through the umbrella valve 160 and into the mixing well 156. The pump assembly 168 may need to be depressed several times to prime the pump for use.

In some embodiments, the underside of the mixing well 156 (or the mixing well surround 180) is formed with several equally spaced tabs (e.g., such as four equally spaced tabs) extending radially outward from a center of the mixing well 156. The tabs may correspond to several equally spaced configured to hold several magnets 164. For example, in one embodiment, four pockets are provided, each holding a magnet 164. The magnets 164 are positioned to sit near the top surface of the mixing well surround 180 to magnetically engage a steel ring in the powder assembly 110 (not shown in FIG. 3) when the powder assembly 110 is positioned near the mixing well 156. This allows the powder assembly 110 and the liquid assembly 150 to remain in contact while in use or while awaiting use.

The inner cap 166 (which may also be referred to as a threaded insert) generally acts as a frame of the assembly. It has a lower cylindrical area with a threaded recess to engage the neck of bottle 170. On the central axis there is a hole and features to accept and retain a pump assembly 168 from below, such that when the bottle 170 is screwed into the threaded recess, a foam liner 174 is compressed and seals the bottle 170 to the inner cap 166. When the pump assembly 168 is configured for use a pump stem 169 protrudes upwardly along a center axis out of the center hole of the inner cap 166 to be connected to the umbrella valve 160 (e.g., via a tube). Pursuant to some embodiments, the inner cap 166 (or another component of the liquid assembly 150) is formed with features that work in conjunction with features of the mixing well 156 to limit the range of motion of the mixing well 156 when the mixing well 156 is depressed. For example, in some embodiments, the inner cap 166 may have equally spaced vertical radial ribs that are positioned about the circumference of the inner cap 166. The ribs may be formed and positioned to work with equally spaced patterns of cut-outs formed on a lower portion of the mixing well 156 that limit the downward stroke of the mixing well 156.

Further, the ribs and cut-outs may be shaped to allow the mixing well 156 to be rotated between a locked and an unlocked position. When in the locked position, the ribs and cut-outs may prevent the mixing well 156 from being depressed and while in the unlocked position the ribs and cut-outs may allow the mixing well 156 to be depressed (although in a limited range of motion).

In some embodiments, the inner cap 166 is shaped to match the shape of the external shell (the liquid assembly cap 152). In the embodiment depicted, the liquid assembly cap 152 and the inner cap 166 are generally square in cross-sectional shape, although those skilled in the art will appreciate that other shapes and configurations may also be used. In some embodiments, the inner cap 166 is open at the bottom so that the bottle 170 may be accessed by a user when the base 154 is removed from the liquid assembly cap 152. When the base 154 is removed, the bottom of the bottle 170 may be accessed for a user to unscrew to refill the liquid contents or to replace with a new bottle 170. For example, the length of the inner cap 166 is selected such that the bottle 170 protrudes beyond the lower end of the inner cap 166 allowing an area for a user to grasp and unscrew the bottle 170 from the inner cap 166. As shown in FIG. 3, the inner cap 166, the base 154 and the liquid assembly cap 152 may mate to provide a friction fit between the components ensuring the assembly stays together during use while allowing a user to separate the base 153 as needed. Those skilled in the art will appreciate that other approaches may be used to secure the components together.

Pursuant to some embodiments, the liquid assembly cap 152 is formed as a hollow shell shaped to fit closely onto the inner cap 166. The bottom end of the liquid assembly cap 152 is open to accept the mixing well 156 and the inner cap 166. In some embodiments, the vertical walls are substantially solid and the flat top surface has a central cylindrical bore sized to fit about the cylindrical mixing bowl 162 with clearance. At the top edge of the hole, an inward 360 degree step is sized to touch the top of the mixing well 156 elastomeric seal ring when at rest, yet allow the mixing well 156 to move vertically on axis within the bore.

In some embodiments, the mixing well 156 is shaped and configured to allow a user to mix the liquid and powder together with a single finger. Its shape and size are selected specifically to allow the user to easily scoop the mixture from the mixing well 156. Preferably, the mixing well 156 has no corners or recesses in which the mixture could be trapped. For example, the mixing well 156 may be ergonomically designed to allow for easy mixing with a user's finger (such that the well is not too shallow but with enough depth so powder doesn't fly out of the well).

The base 154 serves to protect the interior of the assembly as well as to provide an improved aesthetic when assembled. The base 154 is shaped to match the shape of the liquid assembly cap 152. The top end of the base 154 is open and the base 154 consists of four sidewalls and a floor 155. The floor 155 may be provided with a central through hole 157 and the inside surfaces of the sidewalls may have a series of horizontal undercut slots 159 formed therein.

A base insert 172 is sized and shaped to just fit into the base 154. The base insert 172 has outward tabs 161 on the four sides of the base insert 172 that engage the undercut slots 159 of the base 154 when pressed together. The central area of the base insert 172 protrudes upwardly to engage the shaped open end of the inner cap 166 by, for example, bumps and undercuts 175. This provides a gentle snap fit between the base 154, the base insert 172, the inner cap 166 and the liquid assembly cap 152. The interior of the base insert 172 defines a cylindrical bore that is sized to fit the outside of the bottle 170. When the base 153 and the base insert 172 are pressed into the inner cap 166 and the liquid assembly cap 152 the bottle 170 is completely encapsulated by those parts. In some embodiments, the base insert 172 has no floor, allowing a user to view the bottom of the bottle 170 through the central through hole 157 of the base 154. This allows a user to determine whether there is liquid 176 in the bottle 170 or if the bottle 170 needs to be replaced or refilled.

Figure 3A:
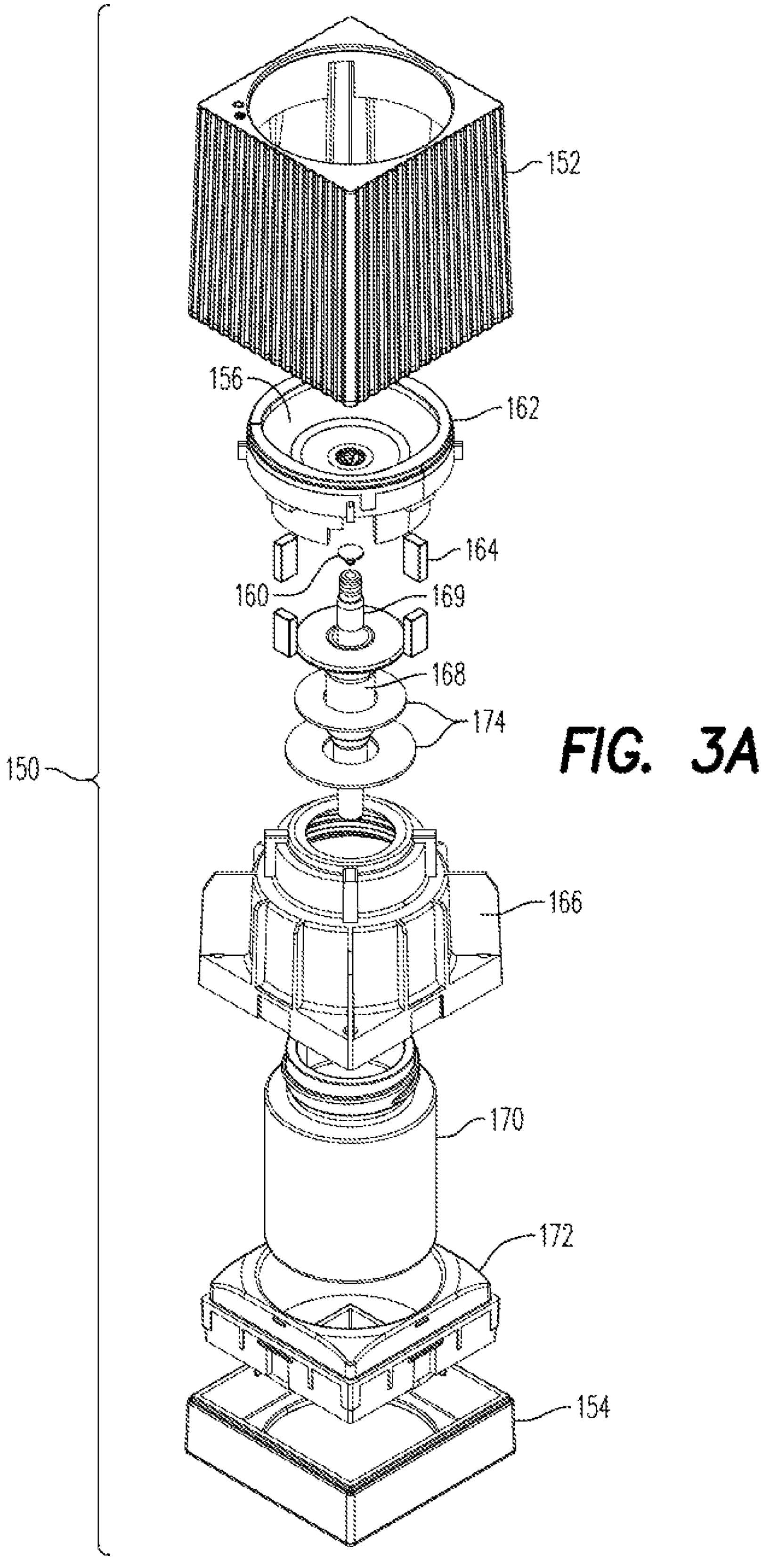
FIG. 3A is an exploded perspective view of a liquid assembly pursuant to some embodiments.

An exploded side perspective view of the liquid assembly 150 is shown in FIG. 3A which may further illustrate the components of some embodiments of the present invention. For example, FIG. 3A illustrates the shape of the underside of the mixing well 156 and depicts how the underside of the mixing well 156 interacts with tabs or fins protruding from the inner cap 166 to move between locked and unlocked positions.

Figure 4:
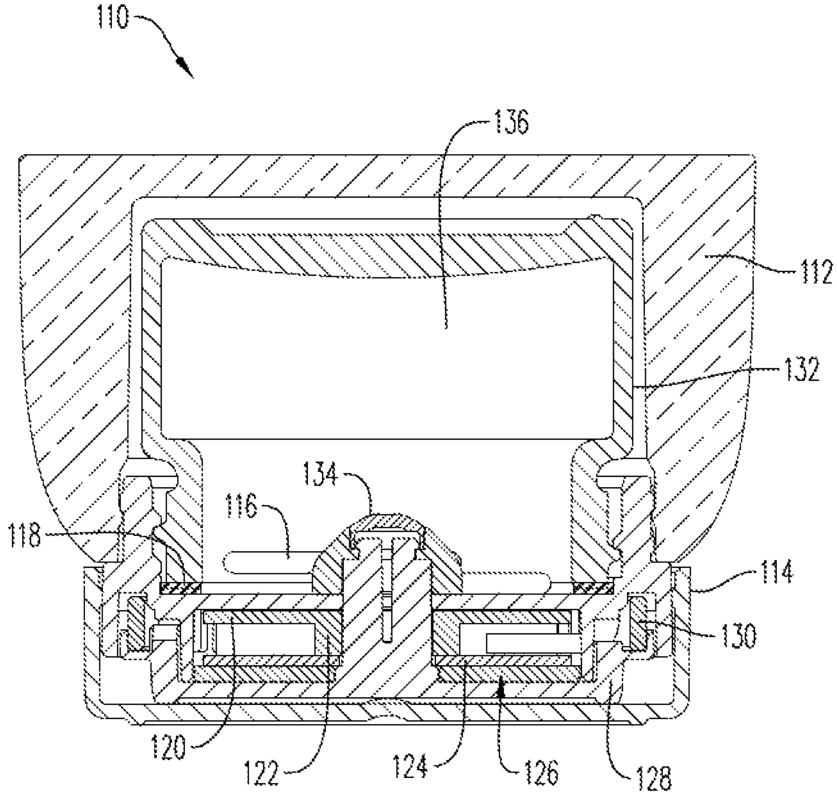
FIG. 4 is a side cross sectional view of a powder assembly pursuant to some embodiments.
Figure 5:
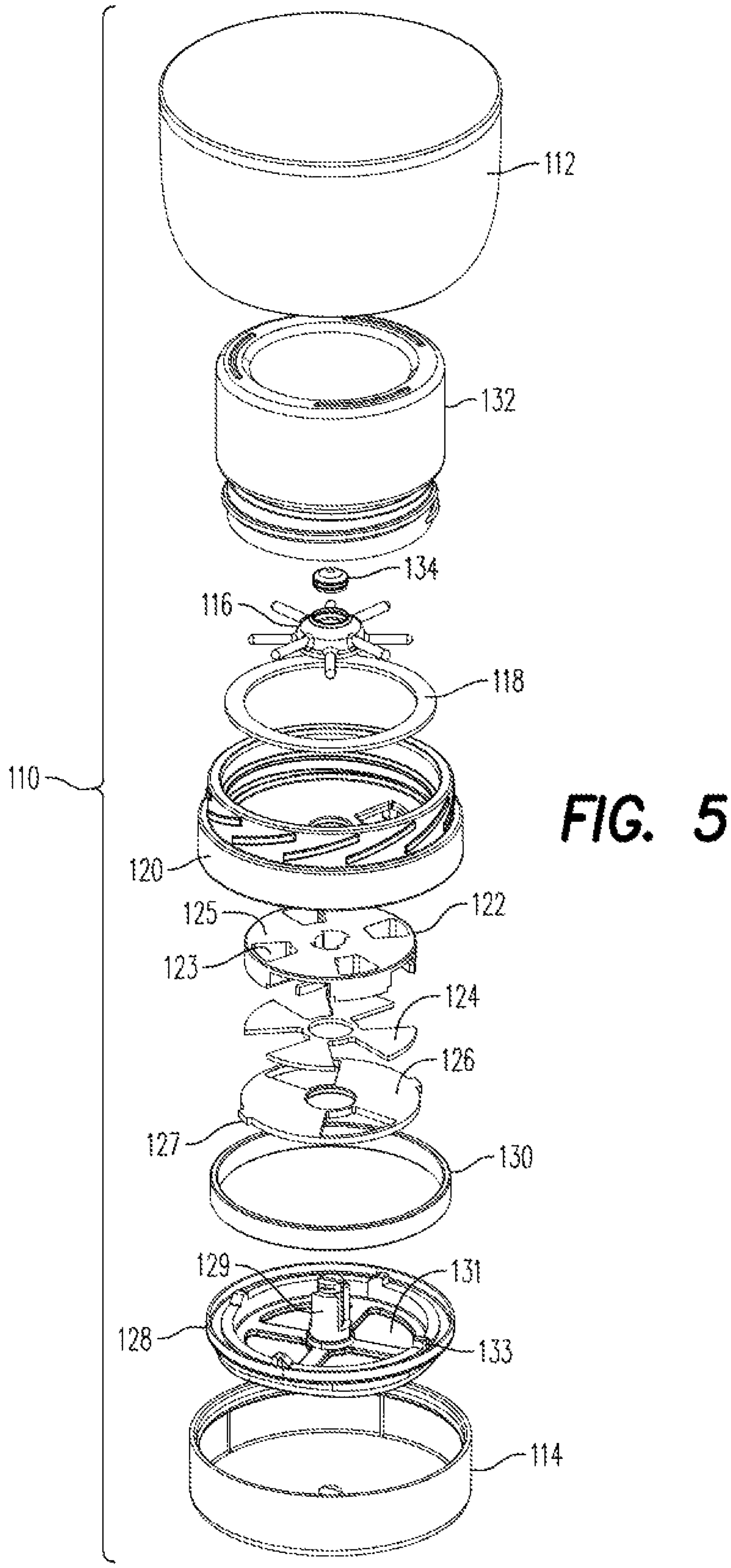
FIG. 5 is an exploded perspective view of a powder assembly pursuant to some embodiments.

Reference is now made to FIGS. 4 and 5 which show details of the powder assembly 110. FIG. 4 shows a side cross sectional view of a powder assembly 110 pursuant to some embodiments. FIG. 5 shows a side perspective view of the components of the powder assembly 110. In general, the powder assembly 110 is a metering dispenser that screws onto a jar containing a non-flowing powdery product so that when the jar is inverted, the product can enter a dispenser unit. The assembly 110 has a shaped bottom that fits onto and magnetically engages above a mixing well 156 of a liquid assembly 150. At rest, the powder assembly 110 is closed. When the powder assembly 110 is rotated an amount (e.g., such as one-quarter turn) to a stop position relative to the mixing well 156, one dose of a specific volume of the product is dropped by gravity into the mixing well 156. Pursuant to some embodiments, each one-quarter turn of the powder assembly 110 results in the dispensing of one dose of the product (which will be referred to herein simply as the powder 136).

The powder assembly 110 is formed of a number of components, including a body or outer bottle 112 which may generally be a cosmetic part that fits over and encloses a jar 132 (containing a powder 136) and which mechanically engages with a powder assembly cap 114. The powder assembly cap 114 is cylindrical and has an open upper side sized to receive a number of components which cooperatively operate to dispense powder for use in mixing with a liquid in the mixing well 156. For example, an anchor 128 is cylindrical and fits rotatably with the powder assembly cap 114. The anchor 128 has a central cylindrical axel 129 (best seen in FIG. 5) protruding upwardly from a thin horizontal floor. The axel 129 has a keyed shape in cross section. The bottom perimeter of the anchor 128 is shaped to fit closely to the mixing well perimeter (e.g., rim 182 of FIG. 2). As shown in FIG. 5, the anchor 128 may have four equally spaced holes 131 in the floor of the anchor 128. Further, there may be four equally spaced angular posts 133 protruding upwardly from the perimeter of the floor. The tip end of the axel 129 is shaped to engage and snap to a mixer 116.

A doser 122 is a cylindrical part having a certain thickness and a central shaped through-hole on the central axis that fits loosely about the anchor axle 129 such that they are axially keyed together with some clearance. The diameter of the doser 122 is sized to fit within the lower central area of the anchor 128. In the embodiment depicted, the doser 122 has four equally spaced doser chambers 123 parallel to the axis, all sized to contain a specific equal volume of powder. In the depicted embodiment, each chamber 123 is sized to contain one-half the volume of a full dose of the powder 136. As such, two chambers 123 of powder 136 provides a single dose. The upper surface of the doser 122 is flat. On the underside of the doser 122, between each chamber 123, is a cantilevered arm 125 with an edge protruding just outside of the circumference of the doser 122. The arms 125 are configured to interfere with the angular posts 133 protruding from the perimeter of the base floor. The arms 125 are flexible and are sized to produce an audible click and vibration as the doser 122 and the powder assembly cap 114 are rotated relative to each other. The vibration improves the flow of the powder into and out of the chambers 123 of the doser 122.

A doser plate 124 is also provided. The doser plate 124 is a flat shaped part sized to fit captively with the underside of the doser 122 and to cover the areas over the arms 125. The doser plate 124 also is shaped to be open below each of the four doser chambers 123. A dispense plate 126 is positioned under the doser plate 124 and is a flat cylindrical part with two through holes spaced at 180 degrees from each other. The perimeter of the dispense plate 126 has two orienting features (or tabs 127) two engage the drive arms 125 such that the dispense plate holes are 90 degrees apart from two holes in the body floor.

A mixer 116 is positioned within the powder assembly 110 and securely snaps onto an end of the axel 129 and holds the assembly together. In some embodiments, the mixer 116 has a series of arms pointing outwardly from the center, in a radial pattern. In some embodiments, the mixer 116 is positioned over a drive arm 120 and extends into a mouth of the jar 132 containing the powder 136. As the unit is rotated during use, the mixer 116 agitates the powder 136 to keep it flowable and helps to move powder 136 over the two holes in a floor of the drive arm 120 to feed the doser chambers 123 effectively. The drive arm 120 has a series of threads which mate with threads of the jar 132. A gasket 118 may be positioned between the drive arm 120 and the jar 132.

In some embodiments, a steel ring 130 is provided, shaped of thin steel in a cylindrical shape and sized to fit inside a perimeter wall of the anchor 128. The steel ring 130 is positioned so that it is proximate the magnets 164 of the liquid assembly 150 when the powder assembly 110 and the liquid assembly 150 are brought proximate each other. Once the parts are assembled, the powder assembly 110 and the liquid assembly 150 may be used together to dispense a predetermined amount of powder for mixing with a predetermined amount of liquid.

With the above description of components of some embodiments of the present invention, a brief description of the operation of a mixing assembly pursuant to the present invention will now be provided. Those skilled in the art, upon reading this disclosure, will appreciate that different configurations of components may be used to achieve the following operation and that the components described above are an illustrative example of specific embodiments.

A user wishing to produce a mixture of a formulation or compound (such as, for example, a skin care formulation) may interact with a mixing assembly of the present invention by first placing ajar 132 containing a powder 136 in an upright position (so that the threads and opening of the jar 132 face upwards such that the powder 136 does not spill from the jar 132). The jar 132 is screwed into the powder assembly 110 as described above. A cosmetic outer cover (shown as the outer bottle 112 above) may then be placed around the jar 132 and the other components of the powder assembly 110. The user may then (or may have previously) screw the bottle 170 containing a liquid 172 into the liquid assembly 150 (and may also attach the base 154 and a decorative liquid assembly cap 152). The liquid assembly 150 is placed upright and the powder assembly 110 is then brought into contact with the upper portion of the liquid assembly 150 such that the bottom of the powder assembly 110 is in contact with the mixing well 156 of the liquid assembly 150. The magnets 164 in the liquid assembly 150 engage with the steel ring 130 of the powder assembly 110 keeping the two assemblies 110, 150 in contact. When the powder assembly 110 is placed in this position, the jar 132 is upside down, allowing powder 136 to fall and fill an area of a doser in the powder assembly 110. The powder 136 generally falls around an area proximate a mixer 116 as well as holes or chambers 123 in the doser. Because only two chambers 123 are exposed at any time, only two chambers 123 are filled with powder at this time, ensuring that only a specific volume or dose of powder 136 is in a position to be dispensed.

The dose of powder 136 is dispensed into the mixing well 156 when the user presses the powder assembly 110 in a downward direction with a light force while also rotating the powder assembly 110 clockwise one-quarter of a turn to a stop. At rest, the four posts 133 on the anchor 128 are sifting proximate depressions or holes 131. Once rotated, the four posts 133 ramp out of the holes 131 lifting the components of the doser vertically as the components ride on top of the four posts 133. This flexes the floor of the anchor 128 like a biased spring, as the center of the anchor 128 is a fixed height but the perimeter height of the parts increase to a fixed level based on the height of the four posts 133.

Continued rotation causes the components to rotate about the fixed central axis. The doser 122 is fixed radially to the anchor 128 and the dispense plate 126 is keyed to the body of the components. As the components rotate, the raised bump ribs in the inner area momentarily interfere with the tops of the doser arms, causing the arms to flex and snap past each of the bumps. This creates a stuttering vibration of the doser at each click, facilitating the free flow of powder into and out of the chambers.

As the body is turned out of the start position, the two open and now filled chambers 123 of the doser 122 rotate away from the openings in the dispense plate 126 to the closed area of the dispense plate 126 shutting off the chambers 123 to the reservoir of powder 136. At the same time, the other pair of chambers 123 become exposed to the two holes in the dispense plate 126. Continued rotation causes the two filled doser chambers to become aligned with the two holes in the dispense plate 126 allowing the enclosed volume of powder 136 to fall out of the chambers 123 by gravity and assisted by vibration.

At the end of a ninety degree rotation, the anchor posts that were in spring compression against the underside of the device encounter the four depressions in the track, causing a sudden downward snap action of the body which helps to evacuate any remaining powder from the chambers as well as tactilely signaling the end of the dispense cycle. This snap-vibration mechanism also helps new powder enter and fill the chambers that are now in communication with the jar. After a single dispense cycle, the powder assembly 110 may be removed from the mixing well and the dose of powder may be mixed with the dispensed dose of liquid to achieve a predetermined ratio of the two ingredients.

As discussed above, the liquid may be dispensed into the mixing well by rotating the powder assembly 110 out of the locked position and then depressing the powder assembly 110, which causes the mixing well 156 to be depressed, thereby activating the pump mechanism and causing a dose of the liquid to be fed into the mixing well 156. The result is a mixing system and method that allows a predetermined volume of powder and liquid to be dispensed on demand for mixing prior to application. Embodiments provide a mixing system and method that allows a user to mix powder and liquid in predetermined proportions at the time the user wishes. Embodiments may be used in conjunction with, for example, skincare compounds which are sensitive to oxygen and ultraviolet light. In general, embodiments allow products (such as skin-care products) to be activated by a user on demand in a way that keeps clinically proven ingredients at peak potency without degradation.

While embodiments have been described herein by reference to skin care and beauty formulations, those skilled in the art, upon reading the present disclosure, will appreciate that other formulations would benefit from the mixing and storage features of the present invention.

Figure 6:
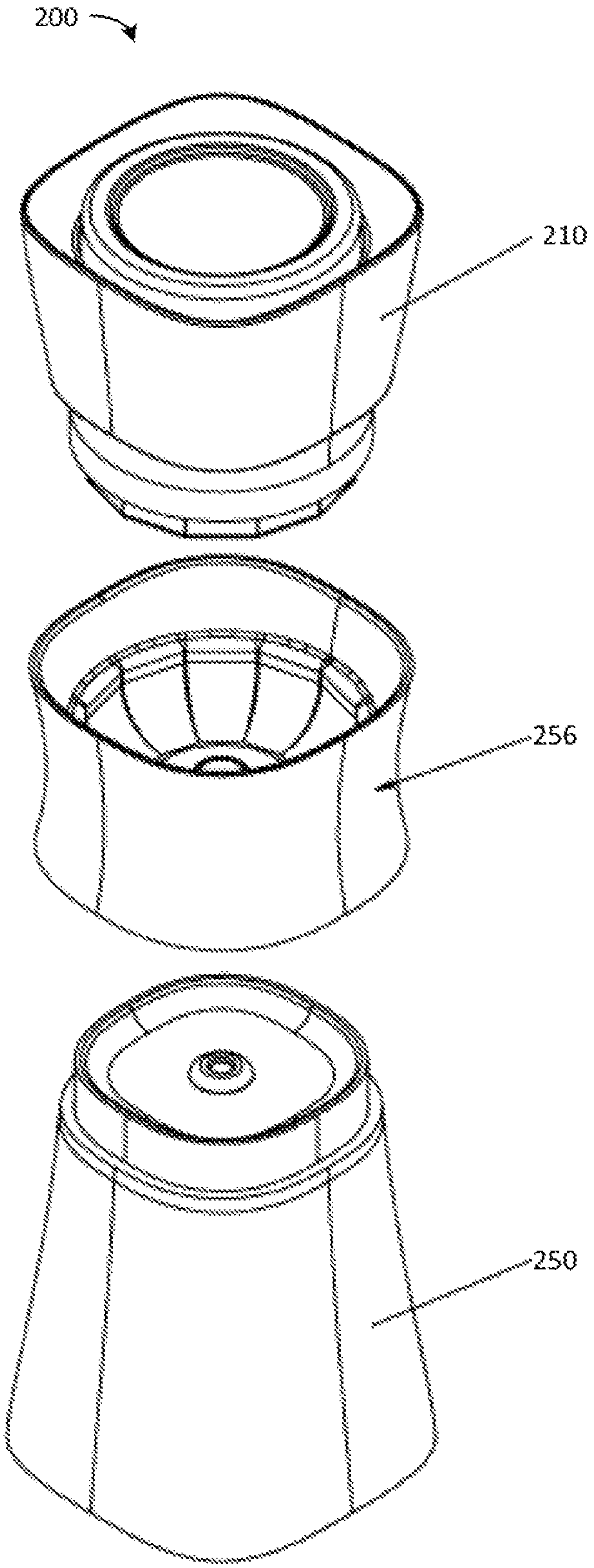
FIG. 6 is a side view of a mixing system pursuant to further embodiments.
Figure 6:
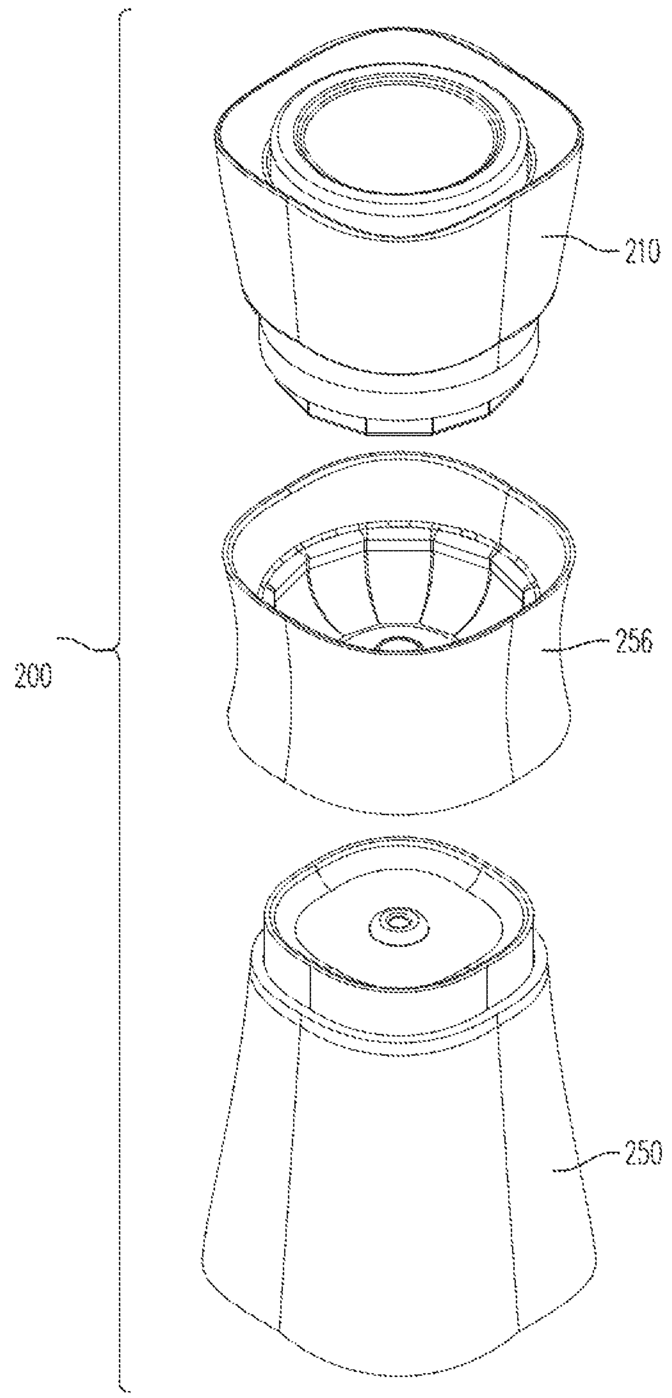

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims. For example, while an embodiment has been described in which a mixing well is provided as part of a liquid assembly, in some embodiments, a mixing well or bowl may be provided as a component or assembly separate from the liquid assembly (e.g., such as a component that sits between a powder assembly and a liquid assembly). An example of such an embodiment is shown in FIG. 6 which is a perspective view of a mixing assembly 200 pursuant to some embodiments. As shown, the mixing assembly 200 includes a powder assembly 210 a mixing bowl 256 and a liquid assembly 250. Each of the components may be made from plastic or other durable material. The three components together function to allow a user to mix a powder and a liquid on demand, allowing, for example, personal care products (such as cosmetics, skin cream or the like) or pharmaceutical products to be created when needed. The liquid assembly 250 and the powder assembly 210 dispense specified volumes of both the powder and the liquid. Controlling these volumes optimizes the effects of the resulting combination.

In use, the assembly 200 operates as follows. A powder (such as dried vitamin C, Retinol, CoQ10, Resveratrol, Willow Bark extract, or the like) is placed in an interior cavity of the powder assembly 210. A liquid (such as an activator) is placed in an interior cavity of the liquid assembly 250. The mixing bowl 256 is placed atop the liquid assembly 250, and the powder assembly 210 atop the mixing bowl 256. The assembly 200 can be operated in any of a number of ways. For example, the assembly 200 can be pumped to cause the liquid to pump into a cavity of the mixing bowl 256. The powder is then dispensed into the mixing bowl 256 by turning or otherwise operating the powder assembly 210. When both elements are in the mixing bowl 256, a user can mix them together with a finger or other device. The mixing activates the ingredients in the powder, thereby ensuring maximum efficacy immediately before applying the mixture to the skin. The assembly 200 can also be twisted (to release the powder from the powder assembly 210) before pumping (to pump the liquid from the liquid assembly 250) and then mixed. Other sequence of operations may also be used. As shown in FIG. 6, the assembly 200 may be formed of different shapes for visual appeal as well as to improve operation of the assembly 200 during use.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. An assembly, comprising:

a powder assembly, having a body containing a quantity of powder and a doser, the doser allowing a selected amount of powder to drop into a mixing bowl when the doser is activated; and a liquid assembly, having a vessel containing a volume of a liquid and a pump assembly for pumping a selected quantity of the liquid into the mixing bowl when the pump assembly is activated;

wherein the mixing bowl is formed in a top portion of the liquid assembly, the mixing bowl having a central through hole connected to the pump assembly, the assembly further comprising a seal, the seal allowing the selected quantity of the liquid into the mixing bowl when the pump assembly is activated and preventing the liquid from draining from the mixing bowl when the pump assembly is not activated.

2. The assembly of claim 1, wherein the pump assembly is activated by depressing the mixing bowl.

3. An assembly, comprising:

a powder assembly, having a body containing a quantity of powder and a doser, the doser allowing a selected amount of powder to drop into a mixing bowl when the doser is activated; and a liquid assembly, having a vessel containing a volume of a liquid and a pump assembly for pumping a selected quantity of the liquid into the mixing bowl when the pump assembly is activated;

wherein the powder assembly has a steel ring positioned near a base of the powder assembly and the liquid assembly has at least a first magnet positioned near a top of the liquid assembly, the steel ring and the at least first magnet holding the powder assembly and the liquid assembly proximate each other.

4. The assembly of claim 1, wherein the mixing bowl is rotatable between a locked position and an unlocked position.

5. The assembly of claim 4, wherein the locked position prevents activation of the pump assembly.

6. The assembly of claim 1, wherein the powder assembly further includes a removable jar, the removable jar holding the quantity of powder.

7. The assembly of claim 1, wherein the vessel is removable from the liquid assembly.

8. The assembly of claim 1, wherein the doser of the powder assembly further includes at least a first chamber sized to hold the selected amount of powder.

9. The assembly of claim 8, wherein rotation of the powder assembly causes the at least first chamber of the doser to dispense the selected amount of powder.

10. The assembly of claim 9, wherein rotation of the powder assembly further causes rotation of a mixer, the mixer agitating the powder to cause the powder to flow into the at least first chamber.

11. The assembly of claim 1, wherein the mixing bowl is removably mounted between the powder assembly and the liquid assembly.

12. A mixing device, comprising:

a powder assembly holding a first container containing a powder, the powder assembly having a powder dispensing means for dispensing a predetermined quantity of the powder;

a liquid assembly holding a second container containing a liquid, the liquid assembly having a liquid dispensing means for dispensing a predetermined amount of the liquid; and a mixing bowl for receiving the predetermined quantity of the powder and the predetermined amount of the liquid;

wherein the liquid dispensing means is activated by depressing the mixing bowl.

13. The mixing device of claim 12, wherein the powder dispensing means includes a doser having at least a first chamber sized to hold the predetermined quantity of powder.

14. The mixing device of claim 13, wherein the powder dispensing means includes a mixer.

15. The mixing device of claim 14, wherein rotation of the powder assembly causes the predetermined quantity of powder to flow through the mixer into the at least first chamber and from the at least first chamber into the mixing bowl.

16. The mixing device of claim 12, wherein the mixing bowl is positionable between a locked and an unlocked position, wherein the unlocked position prevents activation of the liquid dispensing means.

17. The mixing device of claim 12, wherein the mixing bowl is formed as at least one of (i) a top portion of the liquid assembly, and (ii) a component separate from the powder assembly and the liquid assembly.

18. A mixing device, comprising:

a powder assembly holding a first container containing a powder, the powder assembly having a powder dispensing means for dispensing a predetermined quantity of the powder;

a liquid assembly holding a second container containing a liquid, the liquid assembly having a liquid dispensing means for dispensing a predetermined amount of the liquid; and a mixing bowl for receiving the predetermined quantity of the powder and the predetermined amount of the liquid;

wherein the mixing bowl is positionable between a locked and an unlocked position, wherein the unlocked position prevents activation of the liquid dispensing means.

* * * * *